United States Patent [19]

Aso et al.

[11] Patent Number: 5,331,129
[45] Date of Patent: Jul. 19, 1994

[54] UPPER GUIDE ASSEMBLY FOR A WIRE CUT ELECTRIC DISCHARGE MACHINE

[75] Inventors: Toshiyuki Aso; Yuki Kita, both of Oshino, Japan

[73] Assignee: Fanuc Ltd., Yamanashi, Japan

[21] Appl. No.: 949,552

[22] PCT Filed: Mar. 27, 1992

[86] PCT No.: PCT/JP92/00385
    § 371 Date: Nov. 19, 1992
    § 102(e) Date: Nov. 19, 1992

[87] PCT Pub. No.: WO92/17308
    PCT Pub. Date: Oct. 15, 1992

[30] Foreign Application Priority Data

Mar. 27, 1991 [JP] Japan .............. 3-085741

[51] Int. Cl.⁵ .............................................. B23H 7/10
[52] U.S. Cl. .............................................. 219/69.12
[58] Field of Search .............................. 219/69.12, 69.14

[56] References Cited

U.S. PATENT DOCUMENTS 5,055,649 10/1991 Iwasaki et al. .............. 219/69.12

FOREIGN PATENT DOCUMENTS

60-207726 10/1985 Japan .............. 219/69.12
62-130129  6/1987 Japan .
63-260722 10/1988 Japan .............. 219/69.14
63-318217 12/1988 Japan .
63-318219 12/1988 Japan .............. 219/69.14
4-30913   2/1992 Japan .............. 219/69.12

Primary Examiner—Geoffrey S. Evans
Attorney, Agent, or Firm—Staas & Halsey

[57] ABSTRACT

An upper guide assembly for a wire cut electric discharge machine adapted to be mounted with an automatic wire feeding mechanism, which holds the wire without direct mechanical contact. A hold jet nozzle is connected to the upper portion of a body 23, while an upper guide is connected to the lower portion of the body. The body includes an electrode roller for supplying electric power to the wire, and an electrode pinch roller capable of coming into and out of contact with the electrode roller. The hold jet nozzle includes a through hole whose center axis is aligned with a wire path a provided in the upper guide assembly and extending vertically, and a supply passage for pressurized machining fluid communicating with the through hole. The upper guide contains a die guide and an upper nozzle. A guide axis of the die guide and a center axis of the upper nozzle are aligned with the wire path a. During operation of the wire cut electric discharge machine, pressurized machining fluid is supplied to the supply passage to form a water pillar, which produces an urging force in the upper guide assembly, whereby the wire is guided through the upper guide assembly by the water pillar without contacting with interior parts of the assembly.

5 Claims, 6 Drawing Sheets

UPPER GUIDE ASSEMBLY FOR A WIRE CUT ELECTRIC DISCHARGE MACHINE

DESCRIPTION

1. Field of the Invention

The present invention relates to an upper guide assembly for a wire cut electric discharge machine including an automatic wire feeding mechanism.

2. Description of the Related Art

Figure 4:
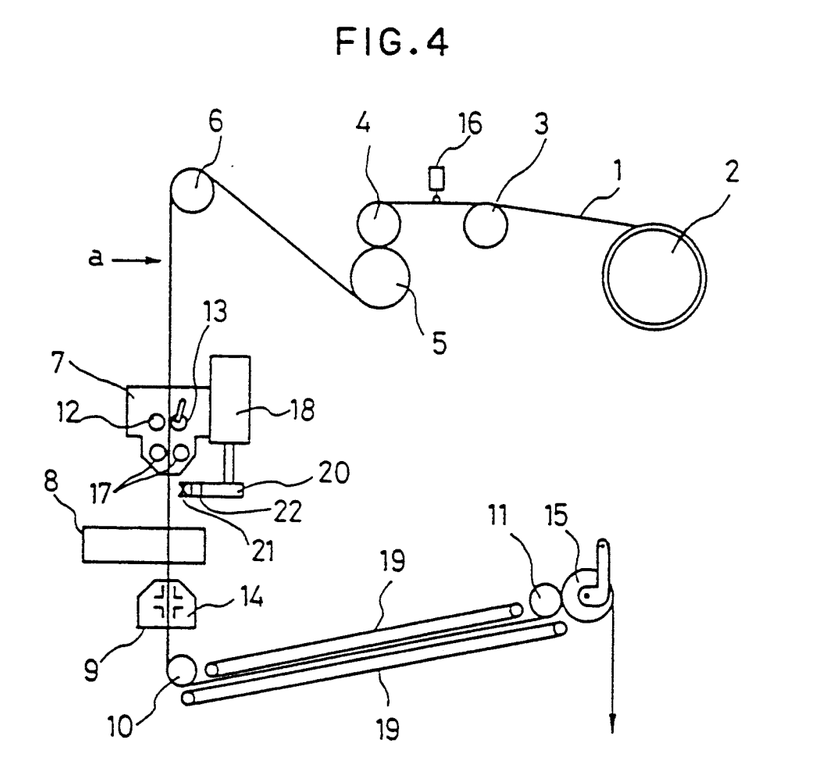
FIG. 4 is a schematic view showing the wire path.

An explanation will be given with reference to FIGS. 4 and 5. In a wire cut electric discharge machine, a wire 1 which functions as one electrode is looped as schematically shown in FIG. 4. More particularly, the wire 1 drawn out of a wire reel 2 is fed to a feed roller 11 through a first guide roller 3, brake pinch roller 4, brake shoe 5, second guide roller 6, upper guide assembly 7, workpiece 8, lower guide 9, and third guide roller 10.

The upper guide assembly 7 includes an electrode roller 12 and an electrode pinch roller 13. These rollers 12 and 13 are disposed to face each other, with a wire path a defined therebetween. The lower guide 9 includes a lower die guide 14. Reference numeral 15 denotes a feed pinch roller which is in urged contact with the feed roller 11.

During wire cutting operation, the electrode roller 12 and the electrode pinch roller 13 pinch the wire 1 therebetween and are in contact with the wire 1 to supply machining power to the wire 1. Further, the wire 1 is drawn out of the wire reel 2 by the feed roller 11, and is fed forward, while a predetermined tension is applied to the portion of the wire 1 which is located between the brake shoe 5 and the feed roller 11, or located at an electric discharge machining position (the position of the workpiece 8). The brake shoe 5 rotates at a speed which is lower than a feed speed of the wire 1 by the feed roller 11 to provide resistance against movement in the direction along which the wire is drawn out, thereby applying aforesaid tension to the wire 1.

Incidentally, control of the tension and feeding speed of the wire 1, control of the movement of the workpiece 8 in the X-axis and Y-axis directions for cutting the workpiece 8 into a desired configuration, or other control, are executed by a numerical control device (NC unit) which is included in the wire out electric discharge machine.

In the case of the wire cut electric discharge machine which includes an automatic wire extension mechanism, a wire-break detecting switch 16, hold rollers 17, 17, wire feeding unit 18, and carrying belts 19, 19 are additionally provided along the wire path a.

The wire feeding unit 18 is attached to the upper guide assembly 7, and is provided at its lower portion with a service arm 20. The service arm 20 is not only vertically movable but also rotatable, so that its distal end portion can be located at a position just under the upper guide assembly 7 and at a home position to be reached by moving upward after retreating from the previous position. Further, a wire cutter 21 and a connecting jet nozzle 22 are attached to the distal end portion of the service arm 20.

Figure 5:
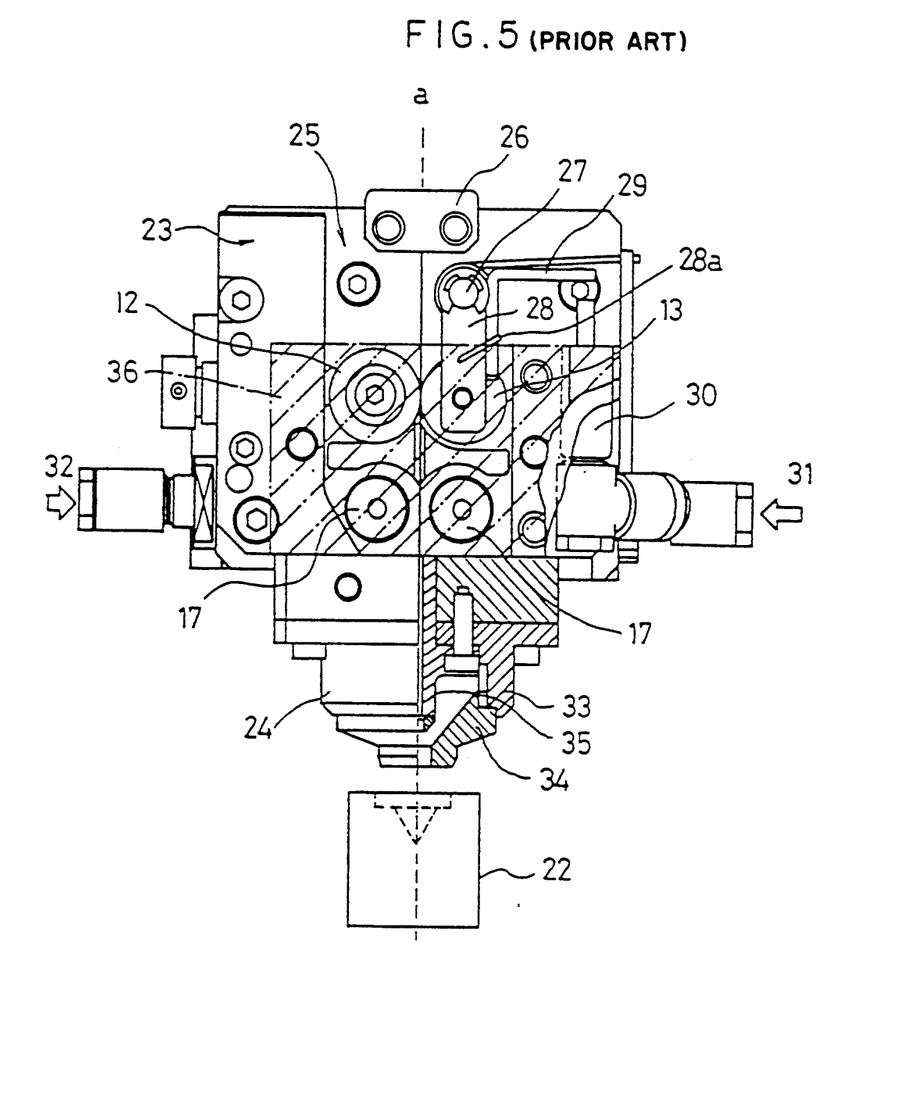
FIG. 5 (PRIOR ART) is a front view showing, partly in cross section, a conventional upper guide assembly.

The upper guide assembly 7 is provided with a body 23 and an upper guide 24 mounted on a lower portion of the assembly body, as shown in FIG. 5 ("PRIOR ART").

Figure 6:
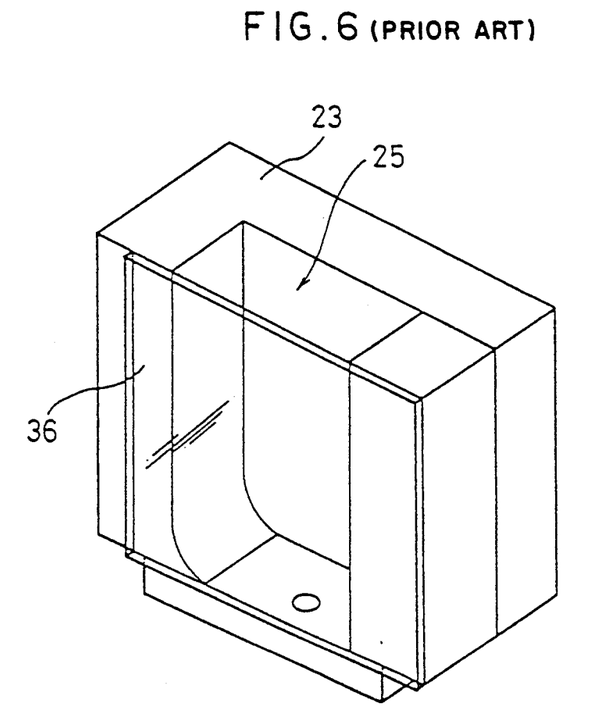
FIG. 6 (PRIOR ART) is a perspective view, partly omitted, of an essential part of a conventional example.

The body 23 is formed at its center portion with a blind groove 25 (See FIG. 6 ("PRIOR ART")) in which a ruby guide 26, the electrode roller 12, the electrode pinch roller 13 disposed to face the roller 12, and hold rollers 17, 17 are mounted. These parts are arranged along the preset wire path a, and a guide axis of the ruby guide 26 is aligned with the wire path a. Moreover, the contacting positions between the electrode roller 12 and the electrode roller 13, and between the hold rollers 17 and 17, are so designed as to be situated on the wire path a.

The electrode pinch roller 13 is mounted on the distal end of an arm 28, which is disposed for rotation around a shaft 27, and is always urged towards the electrode roller 12 by means of a spring 28a. When a lever 29 fixed to the arm 28 is upwardly driven by an air actuator 30, the roller 13 is separated from the electrode roller 12. The air actuator 30 has an air supply port 31. Reference numeral 32 denotes a supply port for the machining fluid.

The upper guide 24 includes a holder 33, an upper nozzle 34, and a die guide 35, and is mounted on the body 23, by being screwed into the body or by using screw means. Furthermore, an inner side of the upper nozzle 34 communicates with the supply port of the machining fluid, which is downwardly injected from the upper nozzle 34 during the cutting operation and during the automatic wire feeding operation. Reference numeral 36 denotes an electrode protective cover.

In addition, the machining fluid fills the groove 25 covered by the protective cover 36, and then overflows from the upper portion of the groove, and the machining fluid is also used for cooling the electrode roller 12.

The wire path a set in the upper guide assembly 7 extends straight in a vertical direction, passing through the body 23 and the upper guide 24 of the assembly.

The automatic wire feeding operation is available as a wire re-feeding operation (AWF) and a broken-wire repairing operation (AWR). According to the AWF, the extended wire 1 is once cut off by the cutter of service arm 20, and the front end of cut wire 1 is then fed forward again to let the wire proceed to a new machining start hole when the preceding cutting operation for one configuration is completed. Whereas, AWR is for repairing the wire 1 which is cut off for any reasons during the cutting operation.

In any of these operations, the automatic wire feeding operation is executed in the following manner:

When the wire is cut off or broken, the rotation of the brake shoe 5 is stopped, while the electrode pinch roller 13 is separated from the electrode roller 12 in the upper guide assembly. At the same time, the hold rollers 17 and 17 are brought into a closed state to hold the cut wire 1 on its upstream side, thereby preventing the wire 1 from upwardly being drawn backward due to the reaction of tension acting thereon. Namely, if the wire 1 passes through a location at which the electrode roller 12 and the electrode pinch roller 13 are in a facing relation, it is impossible to carry out the automatic wire feeding operation, however, this inconvenience can be avoided by the above operations.

Sequentially, the service arm 20 of the wire feeding unit 18 moves from the home position to cause the jet nozzle 22 for wire feeding attached to the distal end of the arm to be brought into close contact with the lower end of the upper nozzle 34 of the upper guide 24, whereby the supply of the machining fluid to the lower guide 9 is stopped to cause the machining fluid to be supplied only to the upper nozzle 34. Next, the carrying belts 19 and 19 are closed to be brought into a state capable of holding the wire 1 therebetween.

When the brake shoe 5 and hold rollers 17 are driven, the wire 1 is fed downwardly to pass through the die guide 35 of the upper guide 24, and further the wire is guided by the water pillar (jet) injected from the jet nozzle 22 to pass through the machining start hold of the workpiece 8. The distal end of the wire 1 then reaches the lower die guide 14 of the lower guide 9. Moreover, when the wire 1 is fed forward until reaching the carrying belts 19, it is fed to the feed roller 11 by way of the carrying belts 19, 19 to complete the wire feeding.

Then, the service arm 20 is returned to the home position; the hold rollers 17, 17 and the carrying belts 19, 19 are opened, while the electrode pinch roller 13 is closed. Further, a state where the machining fluid is supplied to the lower guide 9 is restored, and all of the steps of automatic wire feeding operation are finished.

However, in this case, the support of the wire 1 by the hold rollers 17, 17 is achieved by the direct contact means such that the wire 1 is directly nipped by the two rollers 17, 17. For this reason, if the wire 1 is slightly dented at the point of contact, or if a line connecting the axes of the hold rollers 17 and 17 does not extend at right angles with respect to the wire path a, or if the contacting point of the hold rollers 17 and 17 is laterally deviated from the wire path a, there will be such a risk that the wire 1 is bent along the circumference of the hold rollers 17 and 17.

Further, if the wire 1 is dented, an electric discharge condition changes from normal one at a machining position between the wire and the workpiece 8, and this may cause the occurrence of a streak on the machining surface of the workpiece, or the wire 1 may be broken at the portion on which the streak occurred. Thus, in order to prevent the wire 1 from being bent by the hold rollers 17 and 17, it is necessary to strictly adjust the respective axis position of the two hold rollers 17 and 17 so that a lot of time required for maintenance or inspection can be saved.

SUMMARY

An object of the present invention is to provide an upper guide assembly for a wire cut electric discharge machine designed to be mounted with an automatic wire feeding mechanism, which provides a device capable of holding a wire, in an automatic wire feeding operation, without using any means involving direct mechanical contact with wire.

To achieve the above object, the present invention is based on the technical concept which is a combination of the following constituents:

An upper guide assembly for a wire cut electric discharge machine, comprising a wire path, which is provided extending straight in a vertical direction passing through the assembly, a body, a jet nozzle holder mounted on an upper portion of the body, and an upper guide mounted on a lower portion of the body.

The body includes an electrode roller and an electrode pinch roller which is capable of both coming into contact with and coming out of contact with the electrode roller.

The jet nozzle holder is formed with a through hole whose center axis is aligned with the wire path, and a supply passage for pressurized machining fluid, which is in communication with the through hole.

The upper guide includes a die guide and an upper nozzle whose center axes are aligned with the wire path, and is attached to the body through a holder.

During the operation of the wire cut electric discharge machine, the pressurized machining fluid is supplied to the supply passage, and the water pillar (jet) extending from a ruby guide to a lower die guide is formed by the jet nozzle. Thus, the wire located on the wire path is urged downward and guided by the water pillar.

DETAILED DESCRIPTION OF THE PREFERRED EMBODIMENTS

Figure 1:
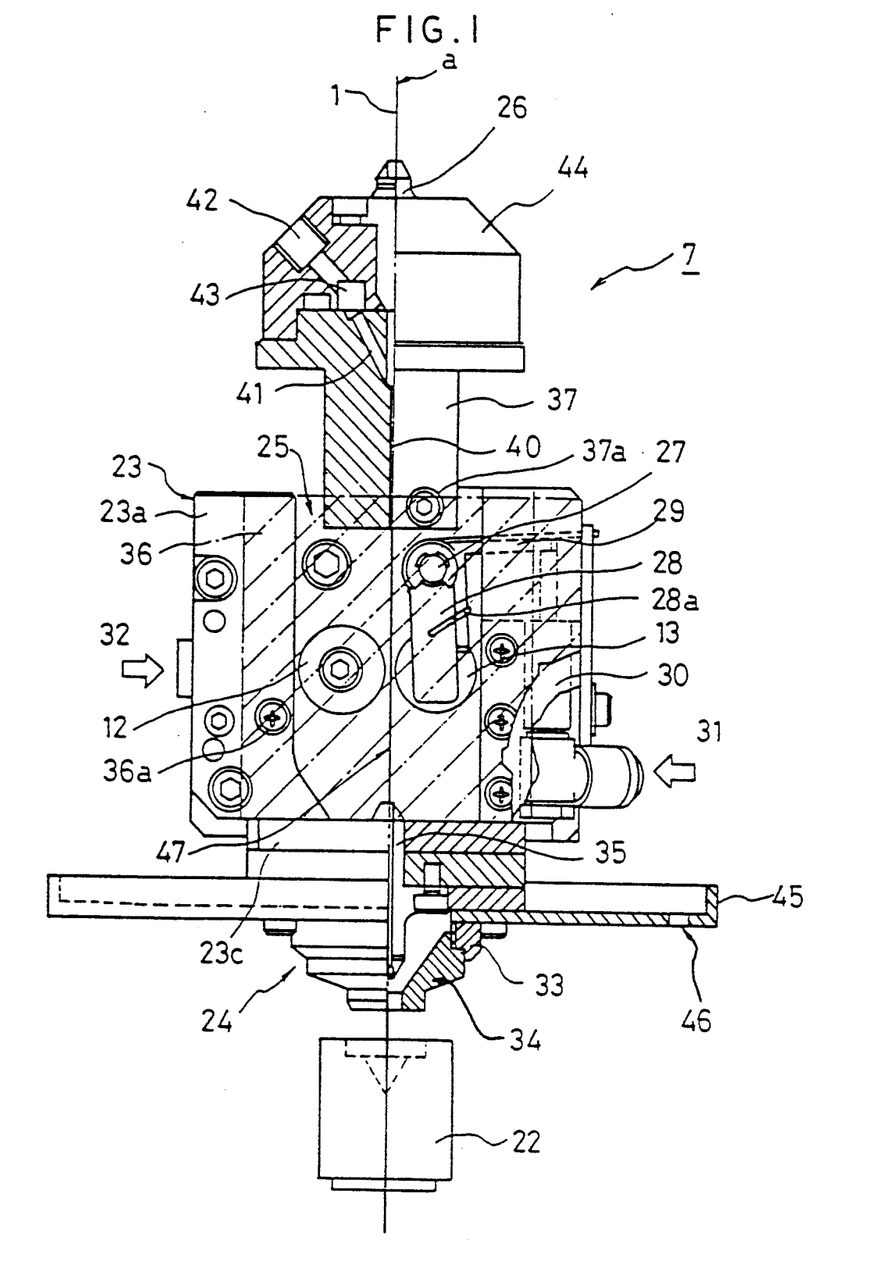
FIG. 1 is a front view, partly shown in cross section, of an upper guide assembly according to the present invention.

In FIG. 1, the upper guide assembly 7 comprises a body 23, a hold jet nozzle 37 and an upper guide 24.

Figure 2:
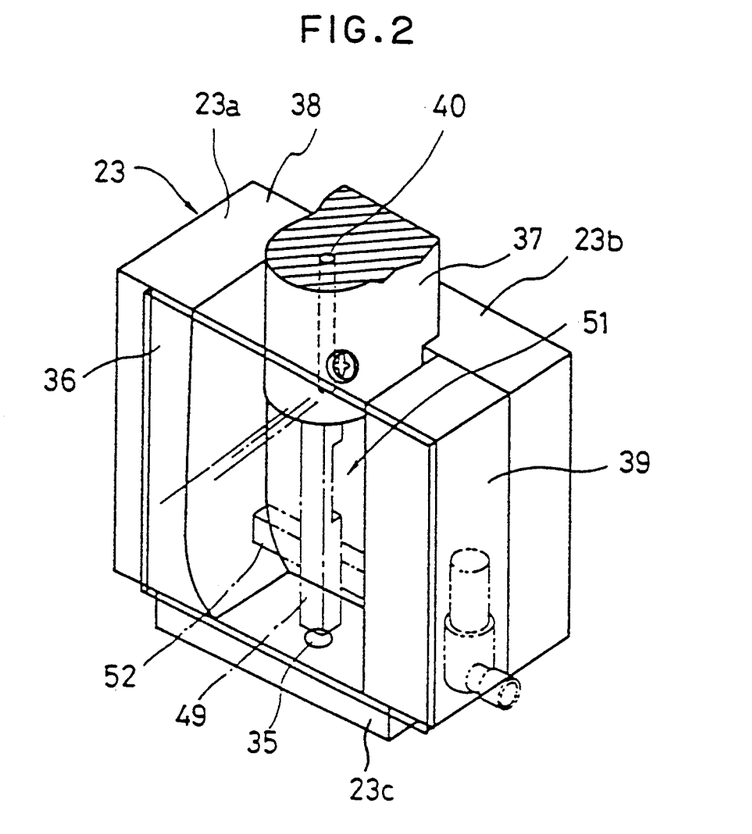
FIG. 2 is a partly omitted perspective view showing an essential part of the upper guide assembly according to the present invention.

As shown in FIG. 2, the body 23 comprises a stainless body block 38 including a left side wall 23a, a back wall 23b and a bottom wall 23c, and also comprises an air unit block 39 which is attached to the body as another side wall. Further, the body is formed at its central part with a blind groove 25, in which an electrode roller 12 and an electrode pinch roller 13 are arranged facing each other, as shown in FIG. 1. The electrode pinch roller 13 is mounted on the distal end portion of an arm 28 which is rotatable around a shaft 27. The arm 28 is always urged to the electrode roller 12 by means of a spring 28a, with the shaft 27 serving as a supporting point. Therefore, the electrode pinch roller 13 is always pressed against the electrode roller 12. However, when a free end of a lever 29 attached to the arm 28 is driven by an air actuator 30, the electrode pinch roller 13 is separated from the electrode roller 12.

In addition, a supply port 32 is provided in the side wall 23a of the body block 38. The supply port 32 communicates with an upper nozzle 34 (mentioned later) of the upper guide 24, and an ordinary machining fluid is supplied thereto. The air actuator 30 and an air supply port 31 are provided in the air unit block 39. Further, an acrylic resin electrode protective cover 36 is attached to the front surface of the body 2 with screws 36a, whereby a front surface of the blind groove 25 can be covered.

The hold jet nozzle 37 whose lower portion is fixed to the body 23 with a screw 37a, and is provided with a through hole 40, whose center axis is aligned with the wire path, and a pressurized machining fluid supply passage 41 communicating with the through hole. The machining fluid supply passage 41 includes a plurality of passages which are radially arranged around the through hole 40, and respective one ends (outlet) of which open to the through hole 40. In the present embodiment, a guide block 44, including a supply port 42 for pressurized machining fluid, an annular passage 43 communicating with the supply port and a ruby guide 26, is screwed into the upper portion of the hold jet nozzle 37 so as to be fixed thereto. The ruby guide 26 has its guide axis aligned with the wire path a, so that respective other ends (inlet) of the machining fluid supply passage 41 are open to the annular passage 43, whereas the lower end of the ruby guide 26 is connected to the upper end of the through hole 40 in the hold jet nozzle 37. Incidentally, pressurized machining fluid is supplied through a different system, which is independent from that for the supply of the ordinary machining fluid.

The upper guide 24 includes an upper nozzle 34 and a die guide 35, and is attached to the lower portion of the body 23. Further, the upper guide 24 includes a machining fluid receiver 45, whose bottom area is larger than that of the body 23. The machining fluid receiver 45 includes a drain hole 46 on its circumference to drain the received machining fluid onto a predetermined position. The upper end of the die guide 35 extends through the bottom wall 23c of the body block 38, and is exposed in the blind groove 25.

The ruby guide 26, the through hole 40 provided in the hold jet nozzle 37 and the die guide 35 are so arranged as to be aligned with the wire path a, which is set to pass vertically and straight through the upper guide assembly 7. Reference numeral 22 denotes a jet nozzle attached to the wire extension unit 18.

The upper guide assembly 7 of this kind is used for a wire cut electric discharge machine provided with an automatic wire feeding mechanism. However, other construction relating to the wire path a and the structure of the automatic wire feeding mechanism according to the present invention are the same as those of the aforementioned conventional example, and thus detailed explanation will be omitted.

When the operation of the wire cut electric discharge machine is started, the machining fluid is always supplied to the supply port 42 for obtaining pressurized machining fluid, and a water pillar 47 (jet) is formed between the hold jet nozzle 37 and the die guide 35, by the pressurized machining fluid, which moves downward. That is, the hold jet nozzle 37 is a means for injecting the water pillar formed with the pressurized machining fluid into the interior of the upper guide assembly 7.

Therefore, when the wire 1 has to be newly set to the wire cut electric discharge machine upon exchange of the wire reel, for instance, the wire 1 newly drawn out of the wire reel 2 is inserted into the interior from the ruby guide 26 of the upper guide assembly 7 through the brake shoe 5. Further, when the wire 1 has reached the position of the hold jet nozzle 37, it is guided downwardly by means of the urging force of the water pillar 47 formed with the pressurized machining fluid, and is automatically passed through the die guide 35 of the upper guide. Thus, a minor bend of the wire 1 due to having been wound round the reel can be corrected by the urging force of the water pillar 47. Thus, the troublesome wire passing operations which would otherwise required at an initial stage of wire reel exchange can be avoided, since the wire passing operation can be carried out with ease by simply inserting the wire 1 into the ruby guide 26. Since the brake shoe 5 can be kept stopped, the advance of the wire 1 is stopped at a point at which the distal end portion of the wire is kept slightly projecting from the lower end of the upper guide 24, against the urging force of the water pillar 47 formed with the pressurized machining fluid. From this point on, the automatic wire feeding operation will enter the steps for actually feeding forward the wire, as will be explained later.

During the changing operation of the wire reel 2, the ordinary machining fluid is not supplied, and the air actuator 30 is driven to cause the electrode pinch roller 13 to be separated from the electrode roller 12. Further, the automatic wire feeding mechanism is not operated, and its service arm 20 is situated at its home position to be reached by moving upward after retreating from the location just under the upper guide 24.

In addition, the blind groove 25 covered by the protective cover 36 is filled with the pressurized machining fluid injected from the hold jet nozzle 37, and the machining fluid overflows therefrom and drops into the machining fluid receiver 45 to be recovered through the drain hole 46 at a predetermined place.

In this condition, when the automatic wire feeding mechanism is driven, the following operation will take place.

The service arm 20 (FIG. 4) moves downward from the home position, and is rotated, so that the distal end portion of the jet nozzle 22 for wire feeding is brought into close contact with the lower end of the upper nozzle 34 of the upper guide 24. Then, the ordinary machining fluid is supplied to the upper guide 24, with the supply of the machining fluid to the lower guide 9 kept stopped. The machining fluid cooperates with the pressurized machining fluid to form a narrow water pillar (jet) which, from beneath the jet nozzle 22, extends through the machining start hole of the workpiece 8 to reach the die guide 14 of the lower guide 9.

Next, when the brake shoe 5 is rotated according to the wire feed command from the NC unit, the distal end portion of the wire 1 passes through the machining start hole of the workpiece 8 and the lower die guide 14 of the lower guide 9 to reach the carrying belts 19 and 19 which have already been closed. The wire 1 is fed to the feed roller 11 through the carrying belts 19 and 19, whereby the wire 1 is automatically fed forward until desired point is reached. Then, the service arm 20 retreats from the position just under the upper guide 24, and then moves upward to return to its home position, thereby completing the automatic wire feeding. Furthermore, the actuator 30 is de-energized to cause the electric pinch roller 13 to be pressed against the electric roller 12, so that the wire 1 is held between the rollers 12 and 13.

Actually, the automatic wire feeding operation involves various minor operations and controls such as vertical movement of the upper guide assembly 7. However, these operations and controls do not directly relate to the present invention, and so their explanations are omitted here. Moreover, when the electrode pinch roller 13 and the electrode roller 12 are closed (for urged contact with each other), the water pillar 47 is interrupted there to scatter; however, this merely causes the groove 25 to be filled with the non-pressurized machining fluid, which will not cause any substantial adverse effect on the operation.

In the case of a re-feeding operation (AWF) for the wire 1, after the machining is completed, the service arm 20 moves from the home position, and the jet nozzle 22 and the wire cutter 21 attached to the distal end portion of the arm move to the positions just under the upper guide 24. Then, the wire 1, which is still extended or fed forward, is cut off by the cutter. At this moment, the upstream side of the wire 1 cut off is likely to be drawn towards the upstream side by reaction of the tension acting thereon until that time; however, such a behavior of the wire is prevented by the downward urging force of the water pillar. The water pillar 47, which is formed by the hold jet nozzle 37, prevents the upstream side of the wire 1 from slipping through the gap between the electrode roller 12 and the electrode pinch roller 13 which face each other so that a failure in the automatic wire feeding can be prevented. Then, the wire feeding work will be continued, for example, by supplying the machining fluid to the upper guide 24 as described above.

In the case of a broken-wire repairing operation (AWR) for the wire 1, when the wire 1 is broken, the upstream portion of wire 1 is apt to be upwardly drawn due to the reaction of the tension acting thereon until that time, but this can be prevented by the downward urging force of the water pillar 47 formed by the hold jet nozzle 37, thereby avoiding the failure in the automatic wire feeding (repairing) like the aforementioned case. The NC unit delivers the AWR command in response to wire break detection switch 16 so that a series of wire feeding operations, including the action of the service arm 20, can be carried out like the aforementioned manner.

As mentioned above, according to the present invention, the pressurized machining fluid is always supplied to the hold jet nozzle 37 through the separate system, and the water pillar 47 formed by the hold jet nozzle 37 provides the means for preventing the upward drawing of the wire 1, which occurs when the wire 1 is broken or cut off, in the form of the non-contact method with respect to the wire 1, as a means capable of replacing the conventional function carried out by the hold rollers 17 and 17 included in the upper guide assembly 7.

Thus, according to the present invention, the damages such as the dent and bend common to the wire used with the conventional upper guide assembly can be prevented.

In the interior of the upper guide assembly according to the present invention, the water pillar is always formed by the hold jet nozzle, and unlike the conventional upper guide assembly, it is not required to provide detectors for determining the point for opening and closing the hold rollers, and, therefore, the control of the automatic wire feeding can be simplified. Further, the chances of failure in the automatic wire extension operation can be eliminated.

When changing the wire reel, for instance, operation for newly setting the wire can be performed with ease due to the effect of the water pillar.

The wire supporting mechanism in the upper guide assembly according to the present invention does not include moving parts, so that maintenance and control of the supporting mechanism can be simplified.

The present invention is not limited to the above embodiment, and various modifications are possible, as stated in the following examples.

Figure 3:
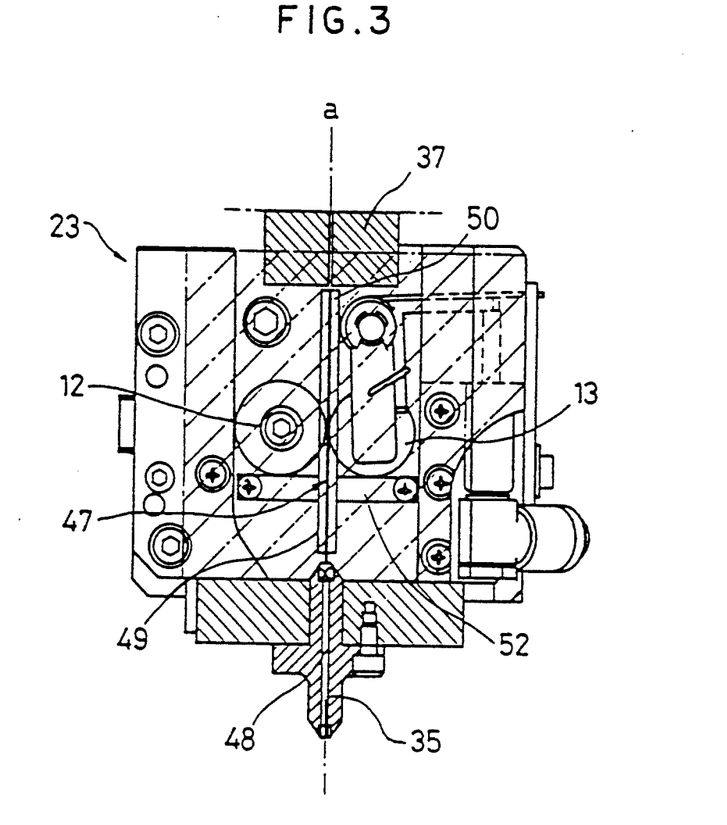
FIG. 3 is a front view showing, partly in cross section, an essential part of another embodiment of the present invention.

FIG. 3 shows another embodiment, characterized by providing a jet guide 49 between a point just beneath the through hole 40 of the hold jet nozzle 37, mentioned in the first embodiment, and a point just above a wire guide hole of the die guide 35.

The jet guide 49 has a cylindrical through hole, which includes a guide hole 50 longitudinally (vertically) extending along the wire path a. Further, the jet guide has a notch 51 at its central portion in the longitudinal direction where the electrode roller 12 and the electrode pinch roller 13 face to each other (FIG. 2). The notch 51 is formed to reach the guide hole 50, so that the electrode roller 12 and the electrode pinch roller 13 are permitted to reach the wire path a and pinch the wire 1 therebetween. The jet guide 49 is fixed to the body block 38 by a lateral bar 52 fixed to a lower portion of the rear face of the guide. The guide hole 50 has a diameter of Φ2.0.

The water pillar 47 formed by the hold jet nozzle 37 is guided to the lower die guide 35 through the jet guide 49. Thus, comparing with the above embodiment, in the case of this embodiment, the urging force of the water pillar 47 is much less disturbed by the whirlpool of the machining fluid collected on the bottom of the blind groove 25 caused by the urging force of the water pillar 47 itself, thereby providing better wire holding and wire feeding functions to the machine.

Moreover, as a still another embodiment, the guide block 44 and the hold jet nozzle 37 may be formed into one piece. Further, the pressurized machining fluid supply passage 41 may be constituted into a single passage.

We claim:

1. An upper guide assembly for a wire cut electric discharge machine, comprising:
   a body having a wire path extending straight in a vertical direction;
   an upper nozzle connected to a lower portion of said body for discharging a jet of machining fluid out of the upper guide assembly and the upper nozzle having its center axis aligned with the wire path; and
   means for forming a pillar of a pressurized machining fluid in the interior of the upper guide assembly by also supplying the pressurized machining fluid into the body independently of the jet of machining fluid supplied to the upper nozzle, the pillar having its center axis aligned with the wire path in the interior of the body, such that a wire passing through the wire path in the upper guide assembly is guided and held by the pillar.

2. An upper guide assembly for a wire cut electric discharge machine, comprising:
   a body having a wire path extending straight in a vertical direction;
   an upper nozzle connected to a lower portion of said body for discharging a jet of machining fluid out of the upper guide assembly and the upper nozzle having its center axis aligned with the wire path; and
   means for forming a pillar of a pressurized machining fluid in the interior of the upper guide assembly by also supplying the pressurized machining fluid into the body independently of the jet of machining fluid supplied to the upper nozzle, the pillar having its center axis aligned with the wire path in the interior of the body, such that a wire passing through the wire path in the upper guide assembly is guided and held by the pillar, said means for forming the pillar of the pressurized machining fluid in the interior of the upper guide assembly including:
   a hold jet nozzle having a through-hole with its center axis aligned with the wire path; and
   a fluid supply passage communicating with the through-hole, said fluid supply passage being supplied with the pressurized machining fluid during an operation of the wire cut electric discharge machine.

3. An upper guide assembly for a wire cut electric discharge machine, comprising:
- a wire path which is set to extend straight in a vertical direction;
- a body;
- a hold jet nozzle connected to an upper portion of the body; and
- an upper guide connected to a lower portion of the body;
- said body including an electrode roller for a wire and an electrode pinch roller capable of both coming into and coming out of contact with said electrode roller,
- said hold jet nozzle including a through-hole having a center axis aligned with the wire path, and a supply passage for pressurized machining fluid communicating with the through-hole, said supply passage being supplied with the pressurized machining fluid during an operation of the wire cut electric discharge machine, and
- said upper guide being mounted to a lower portion of the body, and including, in its interior, a die guide and an upper nozzle both with center axes aligned with the wire path.

4. An upper guide assembly according to claim 3, wherein said body includes a jet guide having a cylindrical through-hole with its center axis aligned with the wire path, said jet guide extending between the bottom of the through-hole of the hold jet nozzle and the top of a wire guide hole of the die guide, said jet guide including a notch which permits the electrode roller and the electrode pinch roller to reach the wire path at a point where the electrode roller and the electrode pinch point face to each other.

5. An upper guide assembly according to 4, wherein a guide block is connected to an upper portion of the hold jet nozzle, and the hold jet nozzle is provided with a plurality of supply passages for supporting pressurized machining fluid, said plurality of supply passages being radially arranged around a through-hole having a center axis aligned with the wire path, while respective one ends of said plurality of supply passages are opened to said through-hole, and
- wherein said guide block includes a supply port for the pressurized machining fluid, an annular passage communicating with the supply port, and a ruby guide having a guide axis aligned with the wire path, while respective other ends of said plurality of supply passages communicate with said annular passage.

* * * * *

UNITED STATES PATENT AND TRADEMARK OFFICE
CERTIFICATE OF CORRECTION

PATENT NO. : 5,331,129     Page 1 of 2
DATED : July 19, 1994
INVENTOR(S) : Toshiyuki ASO et al.

It is certified that error appears in the above-indentified patent and that said Letters Patent is hereby corrected as shown below:

Cover page, item [56] FOREIGN PATENT DOCUMENTS

Before "63-318219" should be ---63-318217---; 219    69.14 and

Insert the following:

--52-64097    5/1977    Japan--; and     --0193610    9/1986    Japan--.

UNITED STATES PATENT AND TRADEMARK OFFICE
CERTIFICATE OF CORRECTION

PATENT NO. : 5,331,129
DATED : July 19, 1994
INVENTOR(S) : Toshiyuki Aso et al.

It is certified that error appears in the above-indentified patent and that said Letters Patent is hereby corrected as shown below:

On cover page, item [56]

Publications

Insert the following:

--"Wire Cut Electrical Discharge Machining Apparatus", K. Inoue, Patent Abstracts of Japan, Vol. 001, No. 125, (M-042), October 19, 1977--.

Signed and Sealed this

Tenth Day of January, 1995

*Attest:*

BRUCE LEHMAN

*Attesting Officer*      *Commissioner of Patents and Trademarks*